United States Patent
Ryan, Jr. et al.

(10) Patent No.: US 6,692,168 B1
(45) Date of Patent: Feb. 17, 2004

(54) METHOD AND SYSTEM FOR SECURE PRINTING OF IMAGES

(75) Inventors: Frederick W. Ryan, Jr., Oxford, CT (US); Walter J. Kulpa, Trumbull, CT (US)

(73) Assignee: Pitney Bowes Inc, Stamford, CT (US)

( * ) Notice: Subject to any disclaimer, the term of this patent is extended or adjusted under 35 U.S.C. 154(b) by 0 days.

(21) Appl. No.: 10/413,978

(22) Filed: Apr. 15, 2003

(51) Int. Cl.$^7$ .......................... B41J 11/44; G07B 17/04
(52) U.S. Cl. .......................... 400/76; 705/401
(58) Field of Search .............. 400/76, 61, 70; 705/64, 401, 405, 406, 407, 409, 410; 347/142, 145, 180; 358/3.16, 3.19

(56) References Cited

U.S. PATENT DOCUMENTS

| | | | | |
|---|---|---|---|---|
| 5,873,663 | A | * 2/1999 | Yokoi et al. | 400/279 |
| 5,898,785 | A | * 4/1999 | Cornell et al. | 380/51 |
| 6,124,946 | A | * 9/2000 | Norton | 358/1.9 |
| 6,502,240 | B1 | * 12/2002 | Naclerio | 717/170 |
| 2003/0081775 | A1 | * 5/2003 | Campagna et al. | 380/46 |

* cited by examiner

Primary Examiner—Andrew H. Hirshfeld
Assistant Examiner—Hoai-An D. Nguyen
(74) Attorney, Agent, or Firm—Brian A. Lemm; Angelo N. Chaclas; Charles R. Malandra, Jr.

(57) ABSTRACT

A method and system for printing an image such as a postal indicium. In accordance with the present invention a sequence of graphic data blocks is formed, the sequence forming a bitmap representative of the image. The blocks are randomly reordered to form a new sequence; and the blocks are printed in the new sequence; a printer printhead being positioned and the blocks being printed so as to print the image without substantial distortion. In one embodiment the blocks are printed in varying directions. In another embodiment the printhead moves are at varying rates of travel and prints at inversely proportional rates as the blocks are printed so as to print the image without substantial distortion. In another embodiment the printhead returns to a home position after printing the image. In another embodiment the system includes a motor responsive to a programmable controller and mechanically coupled to the printhead for positioning the printhead and the programmable controller and the motor are enclosed in a secure housing so that no signals for controlling the motor are available outside of the housing.

14 Claims, 3 Drawing Sheets

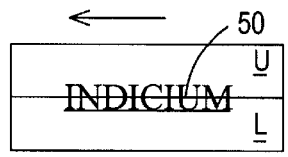
FIG. 2
PRIOR ART
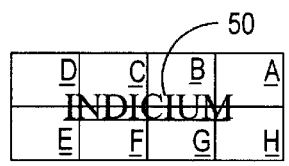
FIG. 3
| TIME/SEQUENCE | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | a ← | B ← | b → | A ← | ↓H ← | G ← | F → | E → | ↑D → | C → | b → | a → | | | | |
| 2 | ↓H ← | g ← | F ← | E ← | ↑D → | C → | b → | ↓G → | ↑B → | A → | | | | | | |
| 3 | a ← | B ← | c ← | D ← | d ↓ | C ← | b → | a ↓H | G ← | F ← | E ← | ↑d → | c → | b → | A → | |
| B | A ← | B ← | C ← | D ← | ↓e → | F → | g → | h → | H ← | G ← | f ← | E ← | ↑d → | c → | b → | a → |
FIG. 4

METHOD AND SYSTEM FOR SECURE PRINTING OF IMAGES

BACKGROUND OF THE INVENTION

The subject invention relates to secure printing of images such as postal indicia. More particularly it relates to printing images in such a manner that printer control signal cannot easily be replicated and used to print images without accounting for them.

Recently a new way of franking mailpieces to evidence payment has been developed and introduced by the assignee of the subject invention in accordance with the Information Based Indicia Program (IBIP) of the U.S. Postal Service. Unlike previous forms of proof of payment such as stamps and postage meter indicia, IBIP indicia do not rely on details of the printing process to provide security but instead incorporate encrypted information unique to each indicium which cannot be produced without knowledge of secret cryptographic keys. IBIP indicia have many advantages. For example, the information incorporated into the indicia not only provides security against counterfeit indicia, but allows the Postal Service to more closely track its operations and the needs of its customers. A particular advantage of IBIP and similar indicia is that, because they do not rely upon particular details of the printing process for security, mailers can print indicia themselves with a conventional digital printer.

However in the case of closed system postage meters, or franking machines, this advantage is not fully realized since the IBIP, as well as other International Postal Standards, require that the printer of a closed system meter be dedicated to printing postal indicia or other meter related information so that the printer cannot be used by a system attacker to print postal indicia that are not accounted for by the meter. Typically this is done by the attacker recording, or otherwise recreating, printer control data communicated to the printer, then using the data to drive the system printer after it is disconnected from the system, or to drive a similar printer.

In the past protection from such attacks has been accomplished by either physically or cryptographically securing the link between the printer and the meter accounting unit (hereinafter sometimes the Postal Security Device or PSD). Physical protection of the link is difficult to achieve, particularly for mutipass printers in which the printhead moves. Cryptographic protection requires encryption of the data; using techniques such as encrypting the printer control data, digitally signing the data, or using message authentication codes. (Note that cryptographic protection of the printer control data is distinct from and in addition to any encryption of postal data which is printed as part of the indicia.)

Thus cryptographic protection requires provision of expensive cryptographic hardware, or time consuming cryptographic software, or some combination thereof at both ends of the PSD/printer link; while physical protection is, as noted, both difficult and expensive. As a result standard off-the-shelf components cannot be used without significant modification.

Thus it is an object of the subject invention to provide a method and system for printing images such as postal indicia where printer control signals used to drive a printhead cannot be easily copied or recreated and which can be implemented using standard printer components without significant modification.

BRIEF SUMMARY OF THE INVENTION

The above object is achieved and the disadvantages of the prior art are overcome in accordance with the subject invention by a method and system for forming a sequence of graphic data blocks, the sequence forming a bitmap representative of the image; then randomly reordering the blocks to form a new sequence; and sequentially positioning a printhead and printing the blocks in the new sequence, the printhead being positioned and the blocks being printed so as to print the image without substantial distortion.

In accordance with one aspect of the subject invention the blocks are printed in varying directions.

In accordance with another aspect of the subject invention the printhead moves are at varying rates of travel and prints at inversely proportional rates as the blocks are printed so as to print the image without substantial distortion.

In accordance with another aspect of the subject invention the printhead returns to a home position after printing the image.

In accordance with still another aspect of the present invention the system includes a motor responsive to a programmable controller and mechanically coupled to the printhead for positioning the printhead and the programmable controller and the motor are enclosed in a secure housing so that no signals for controlling the motor are available outside of the housing.

Other objects and advantages of the subject invention will be apparent to those skilled in the art from consideration of the detailed description set forth below and the attached drawings.

BRIEF DESCRIPTION OF THE DRAWINGS

FIG. 2 shows a schematic representation of a postal indicium printed in accordance with the prior art.

FIG. 3 shows a schematic representation of a postal indicium printed in accordance with the present invention.

FIG. 4 shows a table illustrating successive printing sequences for the indicium of FIG. 3.

DETAILED DESCRIPTION OF PREFERRED EMBODIMENTS OF THE INVENTION

Figure 1:
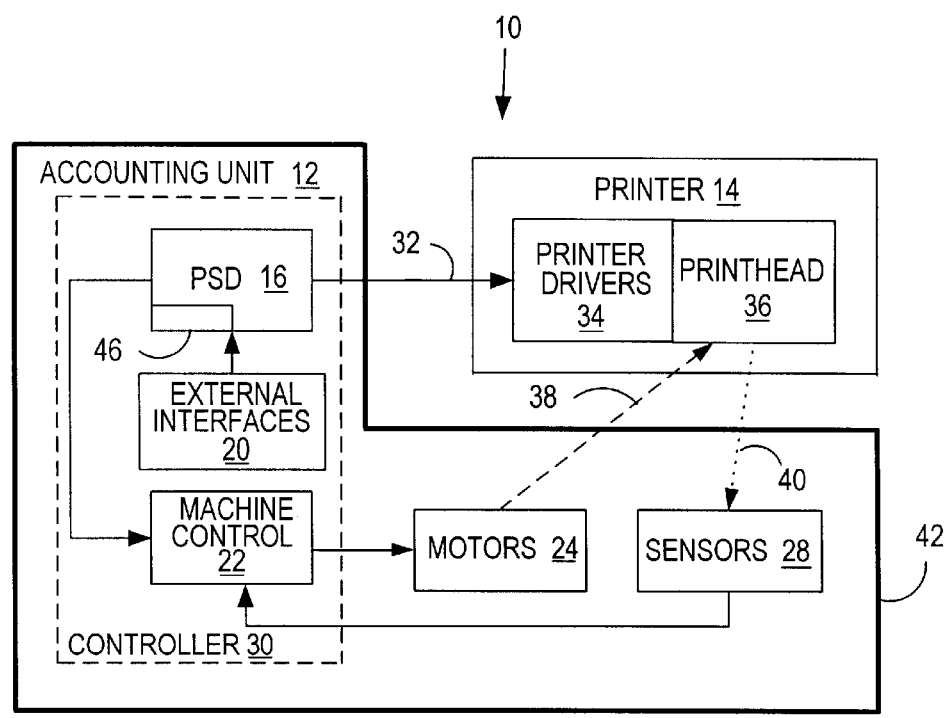
FIG. 1 shows a schematic block diagram of a closed system postage meter in accordance with the present invention.

In FIG. 1 closed system postage meter 10 includes accounting unit 12 and printer 14. Accounting unit 12 includes PSD 16, external interfaces 20, machine control 22, motors 24, and sensors 28. PSD 16, interfaces 20, and machine control 22 comprise programmable controller 30 which controls meter 10. PSD 16 tracks available funds, generates digital representations of indicia in accordance with IBIP or other postal standards, accounts for postage expended, and outputs printer control data through cable 32 to printer driver 34 in printer 12 for printing the indicia. External interfaces 20 provide signals representative of postage amounts as well as other information which can be incorporated in indicia such as dates, sequence numbers, advertising slogans, etc. Motors 24 are responsive to PSD 16 and sensors 28 to drive printhead 36 in printer 12 through conventional mechanical linkage 38. Sensors 28 monitor the motion of printhead 36 in a conventional manner through connections 40 to provide feedback to machine control 22. Except as modified in accordance with the present invention, as will be described further below, the above functions are well understood in the postage metering art and need not be described further for an understanding of the present invention.

While PSD 16 and motor controller 22 have been shown as separate elements for ease of description, those skilled in the art will recognize that they can be implemented as software functions on a single programmable controller 30. More generally, the functions of programmable controller 30 can be apportioned among one or more processors using any convenient architecture and such choice of architecture forms no part of the present invention in its broadest conception.

Typically printer 14 is an inkjet printer or the like where printhead 36 is driven by print drivers 34 to print rows of print elements (i.e. dots) transverse to the direction printhead 16 travels as it is driven by motors 24 to print the indicia generated by PSD 16. As noted above it is a particular advantage of the present invention that printer 14 operates in a conventional manner and that drivers 34 and printhead 36 can be standard off-the-shelf components.

FIG. 2 shows a schematic representation of a manner in which indicium 50 (here represented by "INDICIUM") can be printed in accordance with the prior art. The digital representation, or bitmap, of indicium 50 is output to printer 14 as two, sections. Upper section U is printed as printhead 36 moves to the left, and, after the substrate (i.e. the envelope or label to be franked) is advanced, lower section L is printed as printhead 36 returns to the right. This sequence is the same for every indicium. This fact greatly simplifies the task of an attacker who wishes to record the printer control data and replay it at a later time. For example, in the absence of some cryptographic or physical mechanism for protecting the data, an attacker could record data representative of a high value indicium, set the meter for a low value indicium, disconnect cable 32, and drive printer 14 directly with the recorded data.

FIG. 3 shows a schematic representation of a manner in which indicium 50 is printed in accordance with the present invention. Here the bitmap is output to printer 14 as print blocks A through H, which when printed as shown produce indicium 50 without substantial distortion. In accordance with the present invention In accordance with the present invention blocks A through H are printed in varying sequences and in varying directions, as will be described further below.

FIG. 4 shows a table giving the position, direction of travel, and state, printing or not printing) of printhead 36 as blocks A through H are printed in each of the printhead 36 relative to the printed indicium is shown by the letter of the zone it is over. Upper case letters indicate that the printer 14 is printing; lower case indicates it is not printing. Arrows "←" "→" indicate the direction printhead 36 is traveling, and arrows "↑" "↓" indicate transverse movement of printhead 36 between blocks A through D and E through H.

For sequence 1, at time 0 printhead 36 is at a home position assumed to be the right hand edge of block A. During time period 1 printhead 36 moves to the left without printing to block B. During time period 2 printhead 36 moves to the left and prints block B. During time period 3 printhead 36 moves to the right through block B. During time period 4 printhead 36 moves to the right and prints block A. At the beginning of time period 5 printhead 36 moves downwards to the right edge of block H and then during time periods 5 through 8 moves to the left and prints blocks H through E. At the beginning of time period 9 printhead 36 moves upwards to the left edge of block D and then during time periods 9 and 10 moves to the right and prints blocks D and C. Then during time periods 11 and 12 printhead 36 moves to the right through blocks B and A without printing to return to its home position. Printing of the other sequences is substantially the same in principle; though very different in detail.

From FIG. 4 it can be seen that there is very little commonality between the various sequences. The sequences vary in length and for any particular time period, for different sequences print head 36 will generally be at different locations, moving in different directions and in different print states. As described above, this significantly increases the difficulty of conducting several common attacks on closed system postage meters since the attacker must also determine the sequence of printhead movements and control a printhead appropriately to produce an indicium without substantial distortion.

In a preferred embodiment as shown in FIG. 4 printhead 36 returns to its home position after printing each indium. It is believed that this will simplify control of cumulative error in the position of printhead 36. In other embodiments PSD 16 can calculate a path for printing an indicium starting from whatever position printhead 36 finishes printing of the previous indicium.

Though time periods in FIG. 4 have been shown as constant for simplicity they can vary. For example additional time can be provided if printhead 36 moves transversely during a time period, or printhead 36 can move faster when not printing. In other embodiments the rate of printhead travel can vary from block to block in a manner which varies from indicium to indicium. In one embodiment printhead 36 can travel the same path for each indicium, e.g. ABCDHGFE, while the rate of travel varies randomly from block to block. The print rate is varied proportionately so that the indicium resolution remains constant. (Print rate in dots per second divided by travel rate in inches per second equals resolution in dots per inch.) In other embodiments both the sequence and travel rate for printhead 36 are varied.

Returning to FIG. 1, accounting unit 12 is typically enclosed in secure housing 42 to protect against attacks based on tampering with PSD 16. In the preferred embodiment shown in FIG. 1 motors 24 also are physically located within secure housing 42 so that no signals for driving motors 24 are available outside of housing 42 for recording. In other embodiments motors 24 can be located in printer 14 and in these embodiments signals for driving motors 24 must be present outside of housing 42. These embodiments are believed to still provide a substantial degree of security since an attacker still would face substantial difficulty in synchronously recording motor control signals, which are typically analog, together with the corresponding printer control signals.

Figure 5:
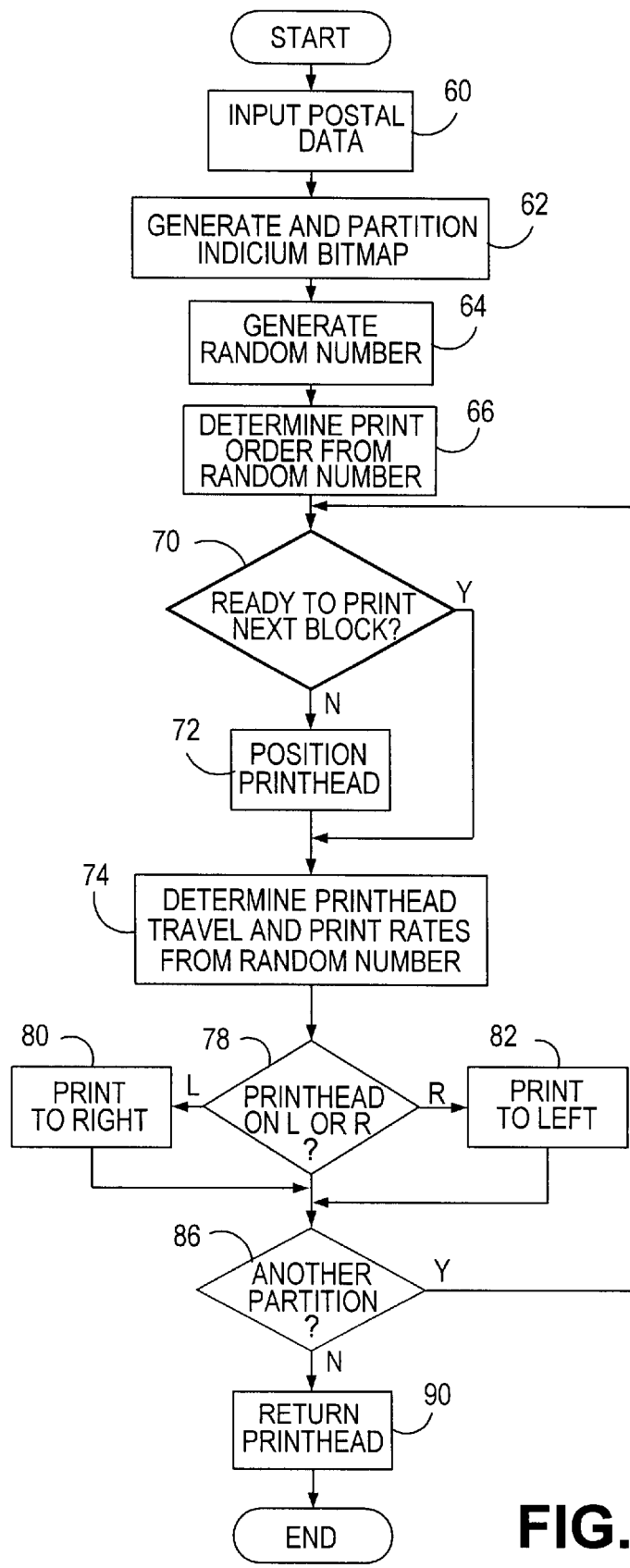
FIG. 5 shows a flow diagram of the operation of the meter of FIG. 1 in printing the indicium of FIG. 3 in accordance with the present invention.

FIG. 5 shows a flow diagram of the operation of controller 30 in carrying out the present invention. Conventional functions carried out by meter 10 which form no part of the present invention per se are not shown to simplify the disclosure. At step 60 controller 30 inputs postal data including the postage amount and any other data necessary to define a postal indicium. At step 62 controller 30 generates a bitmap representation of a postal indicium in accordance with the IBIP, or other applicable postal regulations, and partitions the bitmap into blocks A through H as shown in FIG. 3. Generation of postal indicium is well known in the postage meter art and need not be discussed further here for an understanding of the present invention.

Returning to FIG. 1, in accordance with the present invention PSD 16 incorporates random number generator 46. At step 64 in FIG. 5 controller 30 accesses random number generator 46 to obtain a random number, and at step 66 reorders blocks A through H to form a new sequence in accordance with the random number.

At step 70 controller 30 determines if printhead 30 is ready to print the next block in the new sequence. If so it goes to step 74. Otherwise at step 72 it computes a path and moves printhead 36 to the next block position and goes to step 74.

At step 74 controller 30 determines the printhead travel rate and proportional print rate in accordance with the random number. Preferably in such a manner that the same sequence of blocks generally will be printed using different sequences of travel rates for different indicium. In other embodiments of the present invention travel rates can be constant or can vary cyclically.

At step 76 controller 30 determines if it is positioned at the left or right edge of the next block position and then goes to step 80 or step 82 to print the next block accordingly. Then at step 86 controller 30 determines if there is another block to be printed and if so returns to step 70. Otherwise at step 90 controller 30 computes a path and moves printhead 36 to its home position and exits.

The embodiments described above and illustrated in the attached drawings have been given by way of example and illustration only. From the teachings of the present application those skilled in the art will readily recognize numerous other embodiments in accordance with the subject invention. Particularly though the present invention has been described with respect to a preferred embodiment relating to printing of postal indicium it is applicable to any application where it is desired to control and account for the printing of images. Accordingly, limitations on the subject invention are to be found only in the claims set forth below.

what is claimed is:

1. A method for printing an image, said method comprising the steps of:
   a) forming a sequence of graphic data blocks, said sequence forming a bitmap representative of said image;
   b) randomly reordering said blocks to form a new sequence;
   c) sequentially positioning a printhead and printing said blocks in said new sequence, said printhead being positioned and said blocks being printed so as to print said image without substantial distortion.

2. A method as described in claim 1 where said blocks are printed in varying directions.

3. A method as described in claim 2 where said printhead moves at varying rates of travel and prints at proportional rates as said blocks are printed so as to print said image without substantial distortion.

4. A method as described in claim 1 where said printhead moves at varying rates of travel and prints at proportional rates as said blocks are printed so as to print said image without substantial distortion.

5. A method as described in claim 1 where said printhead returns to a home position after printing said image.

6. A method as described in claim 1 where said image is a postal indicium.

7. A system for printing a bitmapped image comprising:
   a) a printer including a printhead;
   b) a programmable controller for controlling said printer, said programmable controller being programmed to:
      b1) form a sequence of graphic data blocks, said sequence forming a bitmap representative of said image;
      b2) randomly reorder said blocks to form a new sequence;
      b3) sequentially position said printhead and print said blocks in said new sequence, said printhead being positioned and said blocks being printed so as to print said image without substantial distortion.

8. A system as described in claim 7 where said programmable controller is programmed to print said blocks in varying directions.

9. A system as described in claim 8 where said programmable controller is programmed to move said printhead at varying rates of travel and print at proportional rates as said blocks are printed so as to print said image without substantial distortion.

10. A system as described in claim 7 where said programmable controller is programmed to move said printhead at varying rates of travel and print at proportional rates as said blocks are printed so as to print said image without substantial distortion.

11. A system as described in claim 7 where said programmable controller is programmed to return said printhead to a home position after printing said image.

12. A system as described in claim 7 where said programmable controller comprises a postage meter.

13. A system as described in claim 12 further comprising a motor responsive to said programmable controller and mechanically coupled to said printhead for positioning said printhead.

14. A system as described in claim 13 where said programmable controller and said motor are enclosed in a secure housing, whereby no signals for controlling said motor are available outside of said housing.

\* \* \* \* \*